A. B. RISHEL.
AUTOTRUCK.
APPLICATION FILED JAN. 23, 1917.
1,250,225.
Patented Dec. 18, 1917.
2 SHEETS—SHEET 1.
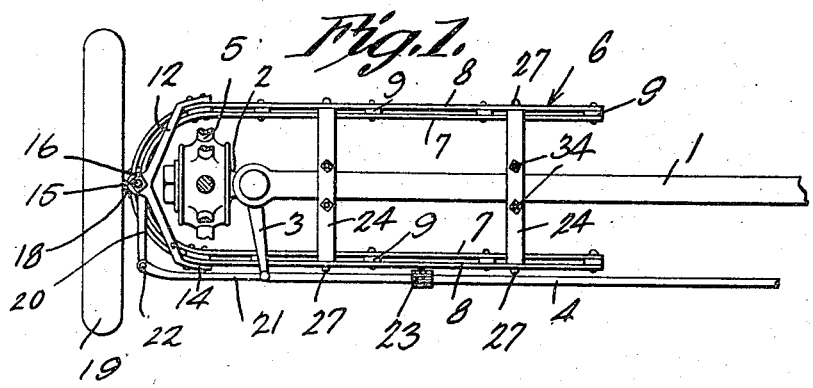
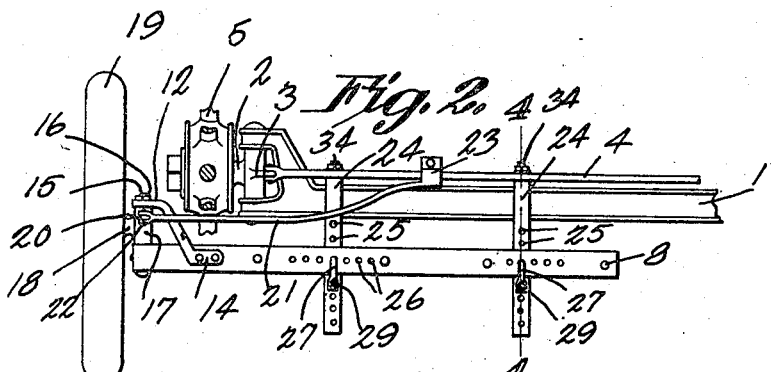
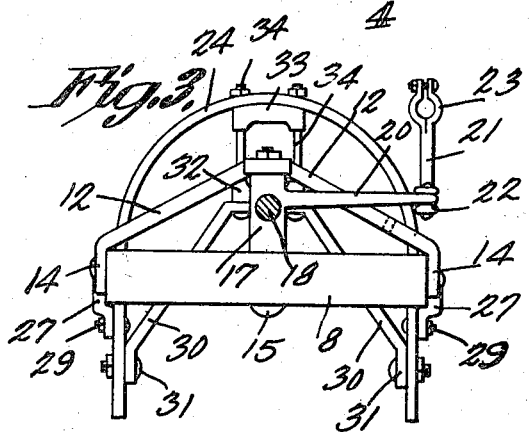
Witnesses
A. B. Rishel, Inventor
by
Attorneys

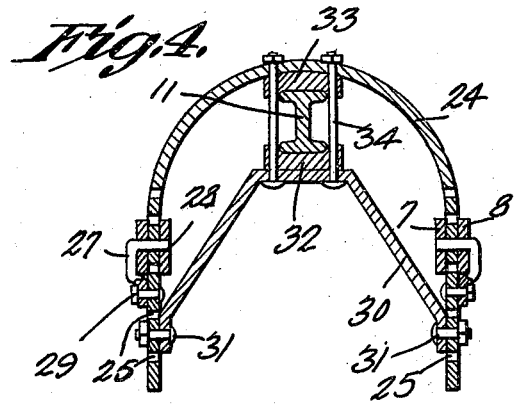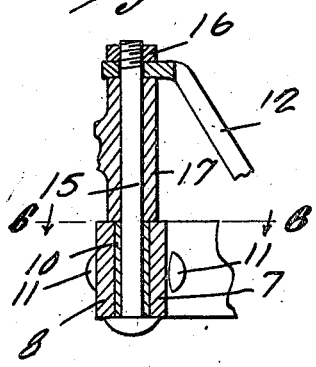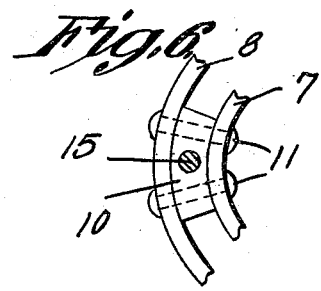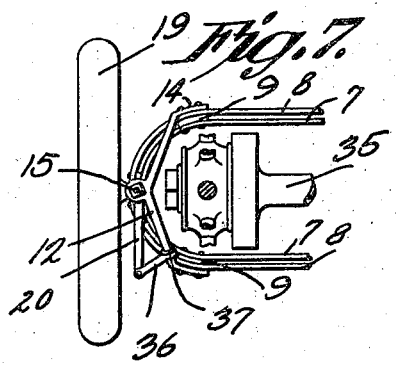

UNITED STATES PATENT OFFICE.

ARTHUR BURT RISHEL, OF GODDARD, KANSAS.

AUTOTRUCK.

1,250,225.   Specification of Letters Patent.   Patented Dec. 18, 1917.

Application filed January 23, 1917. Serial No. 143,958.

*To all whom it may concern:*

Be it known that I, ARTHUR BURT RISHEL, a citizen of the United States, residing at Goddard, in the county of Sedgwick and State of Kansas, have invented a new and useful Autotruck, of which the following is a specification.

The device forming the subject matter of this application is a truck, adapted to be assembled with the axle of an automobile, when the axle is broken or otherwise damaged, or when one of the wheels on the automobile gives out.

The invention aims to provide novel means whereby a supplemental wheel, constituting part of the truck, may be operated and controlled.

Another object of the invention is to improve the construction of the main frame which carries the supplemental wheel.

A further object of the invention is to provide novel means for connecting the main frame with the axle of the vehicle.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings:—

Figure 1 shows the invention in top plan, assembled with the axle of a vehicle;

Fig. 2 is a rear elevation of the device, mounted on the axle of a vehicle;

Fig. 3 is an end elevation of the structure forming the subject matter of this application, the supplemental wheel being removed;

Fig. 4 is a section taken approximately on the line 4—4 of Fig. 2;

Fig. 5 is a fragmental vertical section, taken through the forward end of the main frame;

Fig. 6 is a section taken approximately on the line 6—6 of Fig. 5; and

Fig. 7 is a fragmental top plan, showing the structure mounted on the rear axle casing of an automobile.

In the accompanying drawings, the numeral 1 indicates the front axle of an automobile, having a movable end 2 provided
with an arm 3 pivoted to a steering rod 4, the construction above alluded to being one common and well-known. A damaged wheel 5 is shown as carried by the movable axle end 2.

In putting the present invention into practice, there is provided a main frame 6 which is of U-shape in top plan. The main frame 6 includes an inner bar 7 and an outer bar 8, held apart by spacers 9. Interposed between the bars 7 and 8 of the main frame 6 where said bars curve, at the outer end of the main frame 6, is a block 10, held in place by securing elements 11. The numeral 12 denotes a bracket which is U-shaped in top plan. The end portions of the bracket 12 are secured to the outer bar 8 of the main frame 6, as shown best in Fig. 2, the intermediate portion of the bracket 12 lying above the block 10. In the block 10 and in the intermediate portion of the bracket 12 is mounted a vertical shaft 15, which may be held in place by a nut 16 engaging the bracket 12. Mounted to swing on the shaft 15 between the top portion of the bracket 12 and the block 10 is a sleeve 17 carrying an axle 18 on which is journaled a supplemental wheel 19 adapted to be used in cases of emergency. The axle 18 has an angular arm 20 to which the outer end of the link 21 is pivoted as shown at 22. The inner end of the link 21 is supplied with a clamp 23 coöperating with the steering rod 4, the construction being such that when the steering rod 4 is moved endwise, in the usual manner, the supplemental wheel 19 may be moved to effect a steering of the vehicle.

Disposed transversely of the main frame 6 are upstanding U-shaped yokes 24, the depending ends of which pass between the constituent bars 7 and 8 of the main frame 6. The depending portions of the yokes 24 are provided with openings 25, and a plurality of openings 26 are formed in the bars 7 and 8 of the main frame 6. The numeral 27 indicates retainers disposed against the outer sides of the bars 8 of the main frame 6, and bearing against the depending portions of the yokes 24, below the bars 7 and 8, the retainers 27 being provided with inwardly projecting fingers 28 engaged in the openings 26 of the bars 7 and 8, and in the openings 25 of the yokes 24. Securing elements 29 are mounted in the retainers 27 and may be engaged in certain of the openings 25 in the yokes 24. A bridge 30 is disposed within the contour of each yoke 24, the lower ends of the bridges 30 being united by securing elements 31 with the depending portions of the yokes 24. Each bridge 30 supports a clamp block 32. A clamp block 33 abuts against the under edge of each yoke 24. Through the crowns of the bridges 30, through the clamp blocks 32 and 33, and through the yokes 24 pass securing devices 34 which may be bolts.

In practical operation, the main frame 6 is slid beneath the axle 1, and the yokes 24 are adjusted vertically, the fingers 28 of the retainers 27 being inserted into the openings 26 and 25, after the desired adjustment has been attained. In this way, the vertical position of the main frame 6 may be adjusted. It is possible, further, to shift the yokes 24 toward and away from each other, horizontally, since there are a plurality of openings 26 in the bars 7 and 8 of the main frame 6. The axle 11 is then bound between the clamp blocks 32 and 33, by the action of the securing devices 34. The link 21 is coupled up by means of the clamp 23 with the steering rod 4, and it will now be obvious that the damaged vehicle can proceed in the usual way.

In Fig. 7 of the drawings, the device is shown as mounted on a rear axle casing 35. When such a course is resorted to, the relatively long link 21 of Figs. 1 and 2 is replaced by a shorter link 36, having a clamp 37 adapted to engage the bracket 12, so as to hold the supplemental wheel 20 against swinging movement, it being a matter of common knowledge that automobiles, as at present constructed, are not steered by means of the rear wheels.

The device forming the subject matter of this application is simple in construction and embodies an efficient means whereby a supplemental wheel may be assembled with a damaged vehicle, in case of accident or emergency.

Having thus described the invention, what is claimed is:—

1. In a device of the class described a U-shaped main frame; a supplemental wheel mounted on the outer end of the main frame; upstanding arched yokes connected with the side portions of the main frame; bridges connected with the side portions of the yokes; and means carried by the bridges and the yokes for engaging the axle of a vehicle.

2. In a device of the class described, a main frame; a supplemental wheel mounted on the outer end of the main frame; arched yokes upstanding from the main frame; means for holding the yokes in adjusted positions on the main frame; bridges connecting the side portions of the yokes; and means carried by the bridges and the yokes for engaging the axle of a vehicle.

3. In a device of the class described, a main frame; a supplemental wheel mounted on the outer end of the main frame; arched yokes disposed transversely of the main frame; means for connecting the yokes with main frame for adjustment with respect to the main frame; bridges connecting the opposed portions of the yokes; clamp members carried by the crowns of the bridges; clamp members carried by the yokes at the upper portions thereof; and securing devices uniting the clamp members, the bridges and the yokes.

In testimony that I claim the foregoing as my own, I have hereto affixed my signature in the presence of two witnesses.

ARTHUR BURT RISHEL.

Witnesses:
C. F. McMillen,
A. H. Turner.

Copies of this patent may be obtained for five cents each, by addressing the "Commissioner of Patents, Washington, D. C."